(12) United States Patent
Yu et al.

(10) Patent No.: US 7,076,147 B2
(45) Date of Patent: Jul. 11, 2006

(54) SURFACE LIGHT SOURCE HAVING LIGHT GUIDE PLATE WITH POLYGONAL CELLS

(75) Inventors: Tai-Cherng Yu, Tu-Cheng (TW); Charles Leu, Fremont, CA (US); Ga-Lane Chen, Fremont, CA (US)

(73) Assignee: HON HAI Precision Industry Co., Ltd., Tu-cheng (TW)

( * ) Notice: Subject to any disclaimer, the term of this patent is extended or adjusted under 35 U.S.C. 154(b) by 0 days.

(21) Appl. No.: 11/021,383

(22) Filed: Dec. 23, 2004

(65) Prior Publication Data

US 2005/0158007 A1    Jul. 21, 2005

(30) Foreign Application Priority Data

Jan. 16, 2004   (TW) ................................ 93101190 A

(51) Int. Cl.
*G02B 6/10* (2006.01)

(52) U.S. Cl. ...................................... 385/146; 385/901
(58) Field of Classification Search ................. 385/146
See application file for complete search history.

(56) References Cited

U.S. PATENT DOCUMENTS 6,196,691 B1    3/2001   Ochiai
6,935,764 B1 *  8/2005   Choi et al. .................. 362/326

* cited by examiner

Primary Examiner—Jennifer Doan
(74) Attorney, Agent, or Firm—Tim Tingkang Xia, Esq.; Morris, Manning & Martin

(57) ABSTRACT

A surface light source (100) includes a light guide plate (20) and a pair of point light sources (10). The light guide plate has an incident surface (201) and an emitting surface (202). The point light sources are adjacent the incident surface of the light guide plate, for radiating light beams into the light guide plate through the incident surface. The emitting surface defines a plurality of polygonal cells (2020). Each of the polygonal cells define a plurality of grooves regularly therein. By the cooperation of the polygonal cells and the point light sources, the surface light source has uniform luminance over the whole emitting surface.

22 Claims, 3 Drawing Sheets

SURFACE LIGHT SOURCE HAVING LIGHT GUIDE PLATE WITH POLYGONAL CELLS

CROSS-REFERENCE TO RELATED APPLICATIONS

This application is related to a U.S. patent application Ser. No. 10/970,016 entitled "LIGHT GUIDE PLATE WITH DIFFRACTION GRATINGS AND BACKLIGHT MODULE USING THE SAME", recently filed with the same assignee as the instant application. The disclosure of the above identified application is incorporated herein by reference.

BACKGROUND OF THE INVENTION

1. Field of the Invention

The present invention relates to surface light sources used for devices such as liquid crystal displays, and particularly to a surface light source having a light guide plate with diffusion structures arranged thereon in order to provide uniform illumination.

2. Description of the Prior Art

In general, LCDs have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide uniform light for a clear display.

A surface light source comprises a feed light source and a light guide plate. The feed light source may be a linear light source, or one or more point light sources. The light guide plate has an incident surface through which light from the feed light source is introduced, and an emitting surface for emitting light.

The light guide plate functions to change a direction of propagation of light beams emitted from the feed light source. The light is changed from a direction roughly parallel to the emitting surface of the light guide plate to a direction roughly perpendicular to the emitting surface. That is, the light guide plate effectively changes the linear or point light source(s) into a surface light device, for evenly illuminating a whole display screen of the LCD. Thus, the performance of the surface light source greatly depends on the characteristics of the light guide plate employed therein.

FIG. 3 shows a conventional surface light source 1, which comprises a reflector 12, a light guide plate 13, a diffuser 14, a brightness enhancing film (BEF) 15, and two point light sources 11. The reflector 12, the light guide plate 13, the diffuser 14 and the BEF 15 are stamped together in that order from bottom to top. The point light sources 11 are disposed adjacent an incident surface 131 of the light guide plate 13. The BEF 15 has a plurality of parallel prisms 151 evenly disposed on a top surface (not labeled) thereof In use, light beams from the point light sources 11 enter the light guide plate 13 through the incident surface 131, and then are introduced into the BEF 15 in a direction perpendicular thereto. The BEF 15 converges the light beams to evenly illuminate an associated LCD panel.

FIG. 4 shows an optical intensity distribution of essential light beams in the light guide plate 13. FIG. 5 shows an optical intensity distribution of essential light beams of either one of the point light sources 11. Each point light source 11 emits light beams over a limited predetermined range of angles, and the light beams enter the light guide plate 13 with an uneven distribution. As a result, three dark areas 261,262,263 are created in the light guide plate 13. The luminance of the dark areas 261,262,263 is less than that of other areas. That is, light beams exiting from the surface light source 1 are not uniform.

In addition, the surface light source 1 requires a plurality of elements, including the diffuser 14 and the BEF 15 for enhancing brightness. This adds to the size and the cost of the surface light source 1.

A new surface light source and a light guide plate for the surface light source which overcome the above-mentioned disadvantages are desired.

SUMMARY OF THE INVENTION

An object of the present invention is to provide a surface light source having uniform luminance.

Another object of the present invention is to provide a light guide plate for use in a surface light source, the light guide plate providing uniform luminance.

To achieve the above objects, a surface light source comprises a novel light guide plate and a feed light source. The light guide plate has an incident surface and an emitting surface. The feed light source is adjacent the incident surface of the light guide plate, for radiating light beams into the light guide plate through the incident surface. The emitting surface has a plurality of polygonal cells. Each of the polygonal cells has a plurality of grooves therein. By the cooperation of the polygonal cells and the feed light source, the surface light source has uniform luminance over the whole emitting surface.

Other objects, advantages, and novel features of the present invention will be apparent from the following detailed description of preferred embodiments thereof with reference to the attached drawings, in which:

DETAILED DESCRIPTION OF THE PRESENT INVENTION

Hereinafter, preferred embodiments of the present invention will be described in detail with reference to the accompanying drawings.

Figure 1:
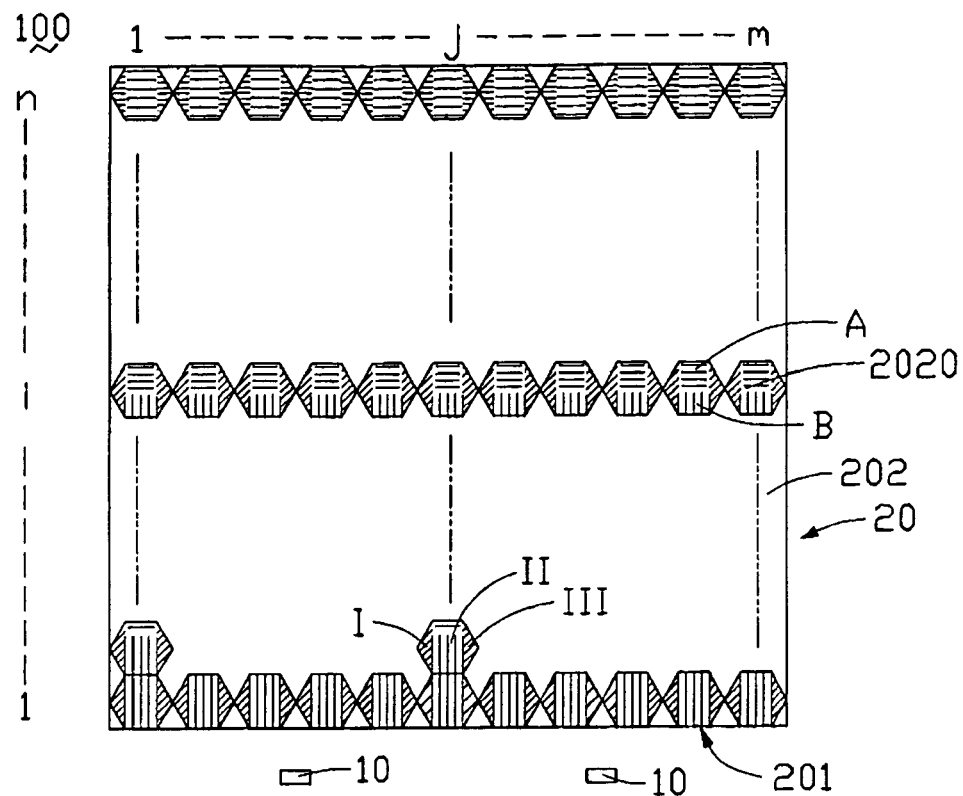
FIG. 1 is a simplified, bottom plan view of a surface light source in accordance with a first embodiment of the present invention.

As shown in FIG. 1, a surface light source 100 in accordance with the first embodiment of the present invention comprises a sheet-like and plate-like light guide member 20, and two point light sources 10 disposed adjacent the light guide plate 20. Each point light source 10 is an LED (light emitting diode), and emits light beams into the light guide plate 20.

The light guide plate 20 has an emitting surface 202, and an incident surface 201 perpendicular to the emitting surface 202. The light guide plate 20 is generally rectangular, and is made from a transparent glass or a synthetic resin Various kinds of highly transparent synthetic resins may be used, such as acrylic resin, polycarbonate resin, vinyl chloride resin, etc. The light guide plate 20 may be other than rectangular, for example square or ovoid.

The emitting surface 202 defines a plurality of polygonal cells thereon, and the polygonal cells function as diffusion elements. The polygonal cells are hexagons 2020, and are arranged in a regular m×n array of columns j and rows i.

Each of the hexagons 2020 has a plurality of grooves regularly arranged therein. The hexagon 2020 has three areas I, II, and III. The grooves in areas I and III of the hexagon 2020 are parallel to each other, and have the same pitch and same obliquity Herein, "obliquity" is defined as the angle in the range between 0° and 90° formed between a groove and the incident surface 201. Area II of the hexagon 2020 generally has two types of grooves, which are designated herein as type A and type B. Type A grooves are parallel to the incident surface 201, and type B grooves are all perpendicular to the incident surface 201. Type A grooves have the same pitch. Type B grooves have the same pitch. The two types of grooves A, B are perpendicular to each other.

Configurations of different hexagons 2020 on the emitting surface 202 vary as follows. Regarding area II, the ratio of the number of type A grooves parallel to the incident surface 201 to the number of the type B grooves perpendicular to the incident surface 201 gradually increases from row 1 through row n. Regarding areas I and III, the grooves in any same row i have the same obliquity In each row i, the pitch of the grooves increases proportionately with increasing intensity of the light beams received by the grooves from the point light sources 10. From row 1 through row n in a same column j, both the pitch and the obliquity of the grooves gradually decreases.

In operation, light beams from the point light sources 10 are introduced into the light guide plate 20 through the incident surface 201. Generally, the intensity of the light beams decreases from a middle area to each of the two opposite sides of the light guide plate 20. As described above, generally, the grooves of the hexagons 2020 have a relatively high distribution density at the two opposite sides of the light guide plate 20, and a relatively low distribution density at the middle area of the light guide plate 20. Accordingly, the hexagons 2020 enhance the intensity of reflected and refracted light beams at the two opposite sides of the light guide plate 20, and effectively compensate for the reduced illumination intensity received by the two opposite sides of the light guide plate 20 from the point light sources 10. Thus, the emitting surface 202 of the light guide plate 20 can avoid having dark areas and can attain uniform luminance, with the point light sources 10 operating at a relatively low luminance. This gives the surface light source 100 improved and energy-efficient performance.

Figure 2:
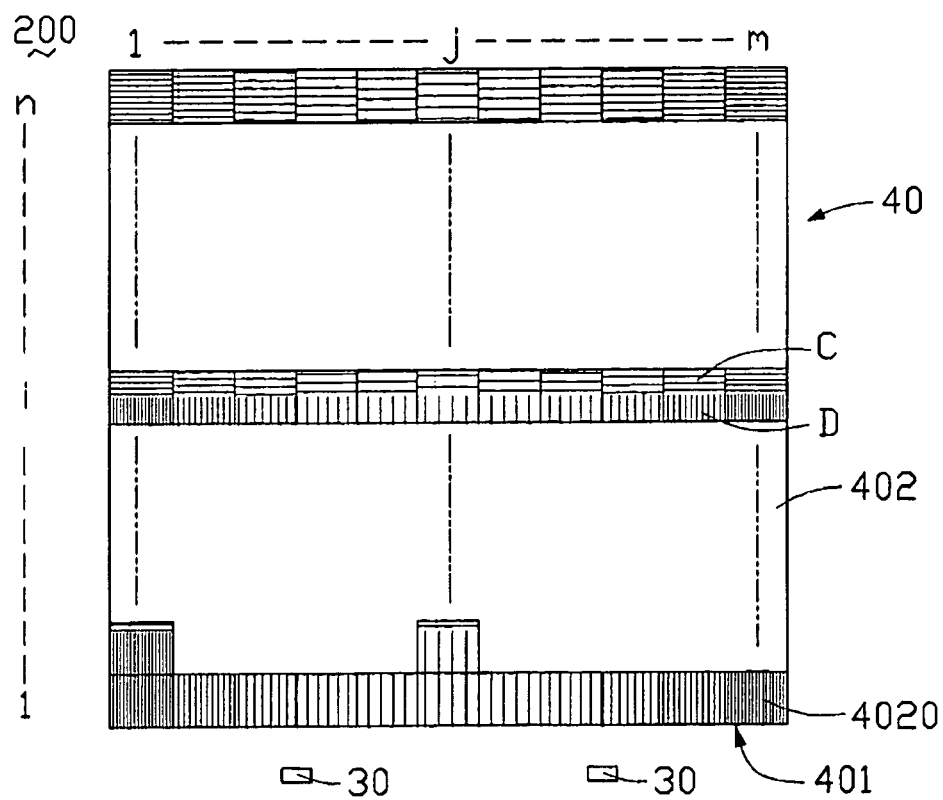
FIG. 2 is a simplified, bottom plan view of a surface light source in accordance with a second embodiment of the present invention.
Figure 3:
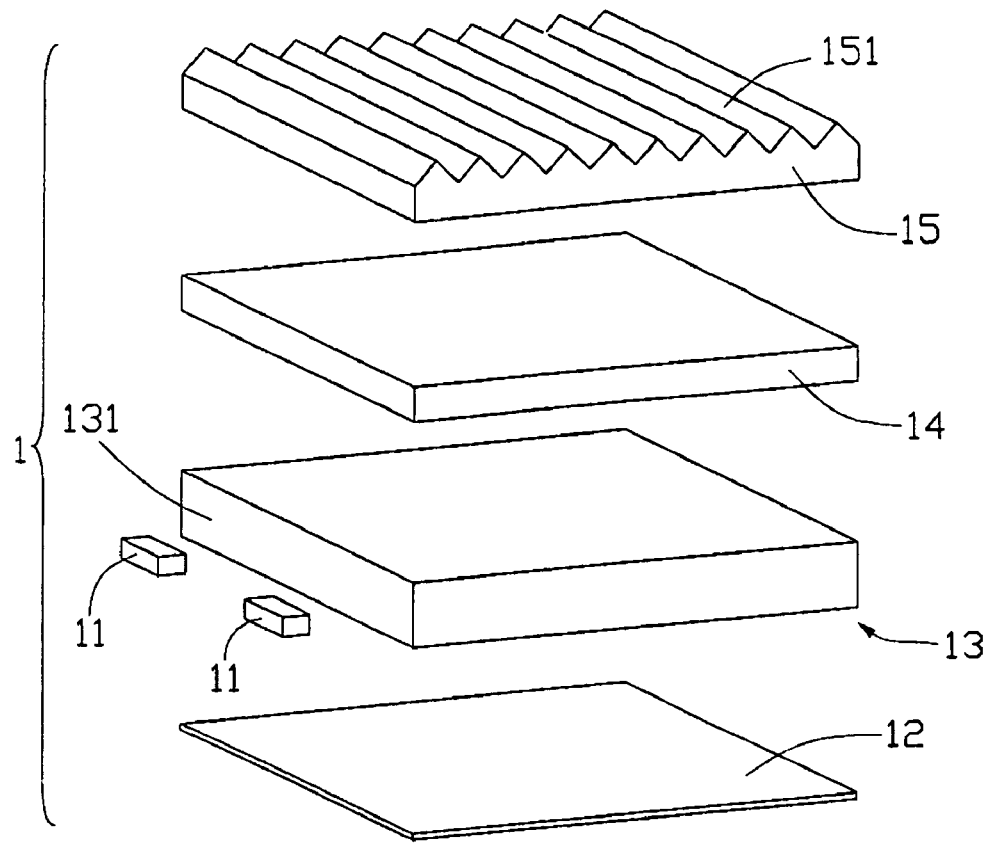
FIG. 3 is an exploded, isometric view of a conventional surface light source.
Figure 4:
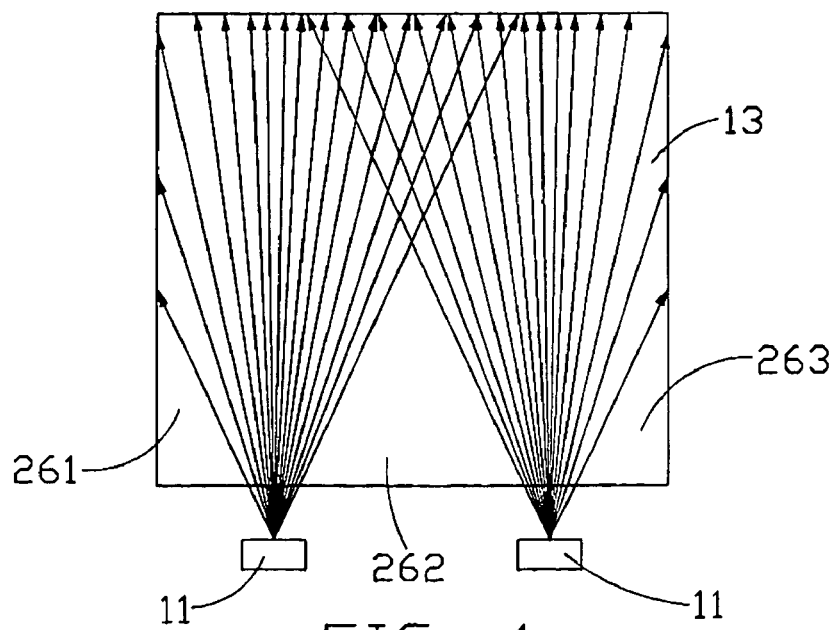
FIG. 4 is a bottom plan view of the surface light source of FIG. 3 fully assembled, showing essential optical light paths of a light guide plate thereof.
Figure 5:
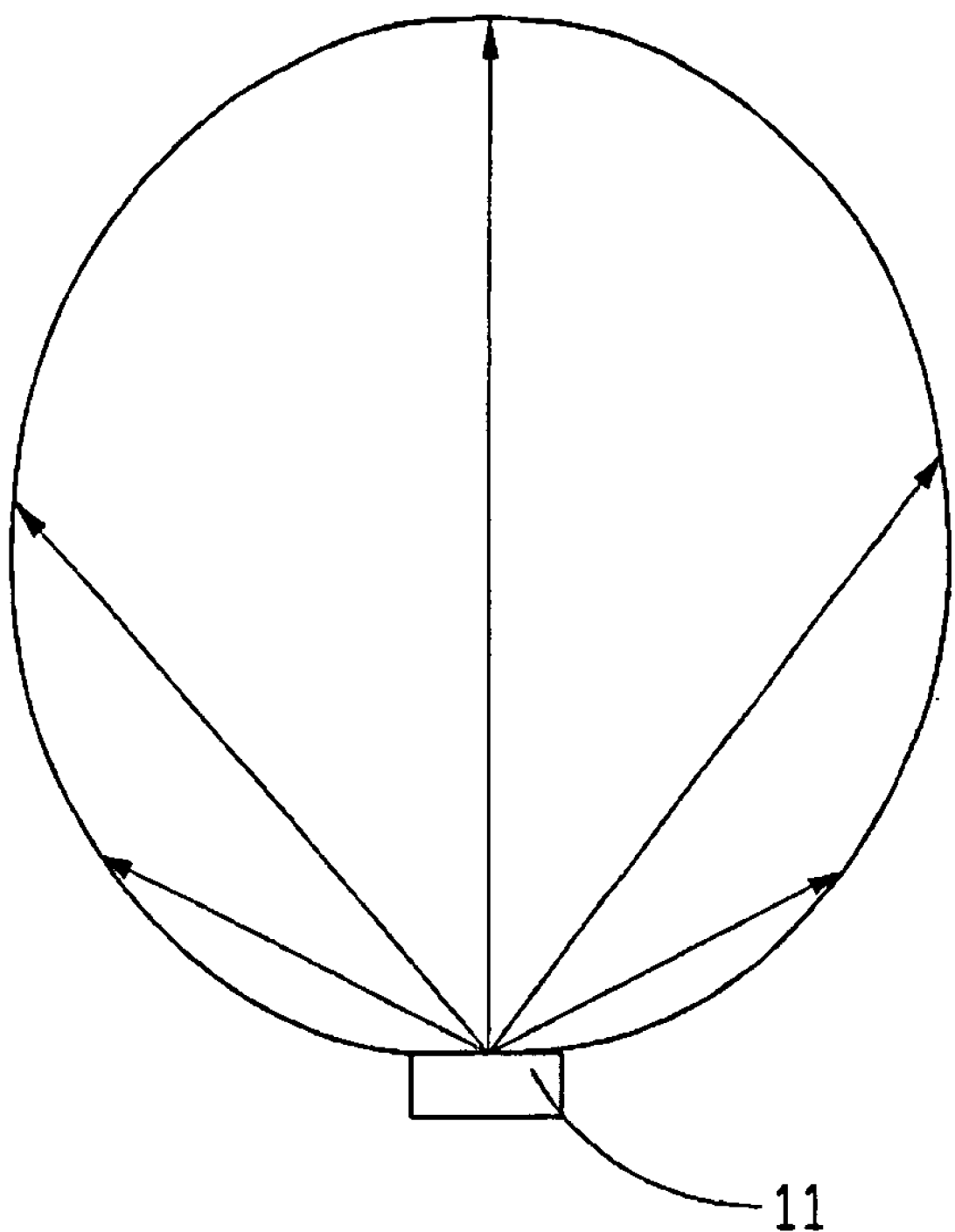
FIG. 5 is an enlarged view of a point light source of the surface light source shown in FIG. 4, schematically showing a distribution of intensity of light beams emitted therefrom.

FIG. 2 shows a surface light source 200 in accordance with the second embodiment of the present invention. The surface light source 200 has a structure similar to that of the surface light source 100 of the fist embodiment, except for the structure of the polygonal cells. In the surface light source 200, the polygonal cells are squares 4020. The squares 4020 are arranged in a regular m×n array of columns j and rows i. Each square 4020 generally has two types of grooves, which are designated herein as type C and type D. Type C grooves of all the squares 4020 are parallel to an incident surface 401, and type D grooves of all the squares 4020 are perpendicular to the incident surface 401. Type C grooves in each square 4020 have the same pitch. Type D grooves in each square 4020 have the same pitch.

Configurations of different square 4020 on the emitting surface 402 vary as follows. Type C grooves in the squares 4020 in a same column j have the same pitch Type D grooves in the squares 4020 in a same column j have the same pitch The ratio of the number of type C grooves parallel to the incident surface 401 to the number of type D grooves perpendicular to the incident surface 401 gradually increases from row 1 to row n. In each row i, the pitches of both types of grooves C, D in the squares 4020 increase proportionately with increasing intensity of the light beams received by the grooves from the point light sources 30. From row 1 through row n in a same column j, the pitches of both types of grooves C, D gradually decreases.

In both embodiments described above, the hexagons 2020 and the squares 4020 are formed by Electron Beam Direct Writing (EBDW) on a core of a light guide plate mold.

The surface light source 100, 200 of the present invention has the advantage of uniform luminance over the whole emitting surface 202, 402 of the light guide plate 20, 40. This is achieved by configuring the distributions and densities of the grooves of the polygonal cells 2020, 4020 to compensate for differences in the intensities of the light beams received from the point light sources 10, 30. Furthermore, because the surface light source 100, 200 has good optical characteristics, there is no need for additional optical films such as a brightness enhancing film (BEF) or a diffuser. Thus the surface light source 100, 200 is compact and inexpensive.

In alternative embodiments of the present invention, the point light sources 10, 30 can be replaced by a linear light source such as a cold cathode fluorescent lamp. Additionally, the number of point light sources 10, 30 is not limited to two. Rather, one or more than two point light sources 10,30 can be employed according to need.

It is to be further understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A surface light source comprising:
   a light guide plate comprising an incident surface and an emitting surface; and
   a feed light source adjacent the incident surface of the light guide plate, and for radiating light beams into the light guide plate through the incident surface;
   wherein the light guide plate further comprises a plurality of polygonal cells at the emitting surface, each of the polygonal cells defines a plurality of grooves therein, the grooves of the polygonal cells have a relatively high distribution density near two opposite sides of the emitting surface and a relatively low distribution density at a middle area of the emitting surface.

2. The surface light source as claimed in claim 1, wherein the grooves of the polygonal cells are configured to reflect and refract the light beams with different intensities received from the feed light source such that the light beams are uniformly emitted from the emitting surface.

3. The surface light source as claimed in claim 2, wherein the polygonal cells are hexagons, and are arranged in a regular array of columns and rows.

4. The surface light source as claimed in claim 3, wherein each of the hexagons defines first, second and third areas, and the grooves in the first and third areas are parallel to each other, and have a same pitch and a same obliquity relative to the incident surface.

5. The surface light source as claimed in claim 4, wherein a majority of the hexagons each have two types of grooves in the second area, the first type of grooves are parallel to the incident surface, and the second type of grooves are perpendicular to the incident surface.

6. The surface light source as claimed in claim 5, wherein in the first and third areas, the grooves in any same row have the same obliquity, in each row, the pitch of the grooves increases proportionately with increasing intensity of the light beams received by the grooves from the feed light source, and in any same column, both the pitch and the obliquity of the grooves gradually decreases from the hexagon nearest the incident surface through the hexagon distalmost from the incident surface.

7. The surface light source as claimed in claim 6, wherein in the second areas, a ratio of the number of the first type grooves to the number of the second type grooves gradually increases from the row nearest the incident surface through the row distalmost from the incident surface.

8. The surface light source as claimed in claim 2, wherein the polygonal cells are squares, and are arranged in a regular array of columns and rows.

9. The surface light source as claimed in claim 8, wherein a majority of the squares each have two types of grooves, the first type of grooves are parallel to the incident surface, the second type of grooves are perpendicular to the incident surface, the first type of grooves in each square have a same pitch and a same obliquity relative to the incident surface, and the second type of grooves in each square have a same pitch and a same obliquity relative to the incident surface.

10. The surface light source as claimed in claim 9, wherein a ratio of the number of the first type grooves to the number of the second type grooves gradually increases from the row nearest the incident surface to the row distalmost from the incident surface.

11. The surface light source as claimed in claim 2, wherein the feed light source is at least one point light source or a linear light source.

12. A light guide plate comprising:
an incident surface for receiving light beams from a feed light source; and
an emitting surface for emitting the light beams; and
a plurality of polygonal cells at the emitting surface, wherein each of the polygonal cells defines a plurality of grooves therein, the grooves of the polygonal cells have a relatively high distribution density near two opposite sides of the emitting surface and a relatively low distribution density at a middle area of the emitting surface.

13. The light guide plate as claimed in claim 12, wherein the grooves of the polygonal cells are configured to reflect and refract the light beams with different intensities received from the feed light source such that the light beams are uniformly emitted from the emitting surface.

14. The light guide plate as claimed in claim 13, wherein the polygonal cells are hexagons, and are arranged in a regular array of columns and rows.

15. The light guide plate as claimed in claim 14, wherein each of the hexagons defines first, second and third areas, and the grooves in the first and third areas are parallel to each other, and have the same pitch and same obliquity relative to the incident surface.

16. The light guide plate as claimed in claim 15, wherein a majority of the hexagons each have two types of grooves in the second area, the first type of grooves are parallel to the incident surface, and the second type of grooves are perpendicular to the incident surface.

17. The light guide plate as claimed in claim 16, wherein in the first and third areas, the grooves in any same row have the same obliquity, in each row, the pitch of the grooves increases proportionately with increasing intensity of the light beams received by the grooves from the feed light source, and in any same column, both the pitch and the obliquity of the grooves gradually decreases from hexagon nearest the incident surface through the hexagon distalmost from the incident surface.

18. The light guide plate as claimed in claim 17, wherein in the second areas, a ratio of the number of the first type grooves to the number of the second type grooves gradually increases from the row nearest the incident surface through the row distalmost from the incident surface.

19. The light guide plate as claimed in claim 13, wherein the polygonal cells are squares, and are arranged in a regular array of columns and rows.

20. The light guide plate as claimed in claim 19, wherein a majority of the squares each have two types of grooves, the first type of grooves are parallel to the incident surface, the second type of grooves are perpendicular to the incident surface, the first type of grooves in each square have a same pitch and a same obliquity relative to the incident surface, and the second type of grooves in each square have a same pitch and a same obliquity relative to the incident surface.

21. The light guide plate as claimed in claim 20, wherein a ratio of the number of the first type grooves to the number of the second type grooves gradually increases from the row nearest the incident surface to the row distalmost from the incident surface.

22. A surface light source comprising:
a light source; and
a light guide member comprising an incident surface facing said light source for receiving light from said light source, and an emitting surface for emitting said light therefrom, a plurality of cells independent from each other being formed in a path of said light from said incident surface to said emitting surface, and each of said plurality of cells having at least two types of grooves extending therein for shaping an outline of said each of said plurality of cells so as to uniformly diffuse said light before said light emits away from said emitting surface.

* * * * *